United States Patent
Horak et al.

(10) Patent No.: US 12,039,676 B1
(45) Date of Patent: Jul. 16, 2024

(54) AUGMENTED REALITY FOR REFLECTIVE PARTICLE TAG ALIGNMENT

(71) Applicant: National Technology & Engineering Solutions of Sandia, LLC, Albuquerque, NM (US)

(72) Inventors: Karl Emanuel Horak, Albuquerque, NM (US); Deborah Ann Haycraft, Albuquerque, NM (US); Heidi A. Smartt, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 19 days.

(21) Appl. No.: 17/730,491

(22) Filed: Apr. 27, 2022

(51) Int. Cl.
| | |
|---|---|
| *G06T 19/00* | (2011.01) |
| *A63F 13/52* | (2014.01) |
| *G06K 19/06* | (2006.01) |
| *G06K 19/07* | (2006.01) |
| *G06T 17/00* | (2006.01) |
| *G06T 19/20* | (2011.01) |
| *H04N 23/63* | (2023.01) |

(52) U.S. Cl.
CPC .......... *G06T 19/006* (2013.01); *A63F 13/52* (2014.09); *G06K 19/06028* (2013.01); *G06K 19/06037* (2013.01); *G06K 19/0723* (2013.01); *G06T 17/00* (2013.01); *G06T 19/20* (2013.01); *H04N 23/635* (2023.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 2018/0348861 | A1* | 12/2018 | Uscinski | ................. G06F 3/012 |
| 2021/0407210 | A1* | 12/2021 | Maggiore | ............. H04W 4/029 |

OTHER PUBLICATIONS

Smartt et al. Passive Optical Tag for Complex Geometric Applications With Noncontact Reader, Dec. 1-7, 2013 (Year: 2013).*

* cited by examiner

*Primary Examiner* — Robert J Craddock
(74) *Attorney, Agent, or Firm* — Daniel J. Jenkins (57) ABSTRACT

A system and method for visual alignment of Reflective Particle Tags (RPT) includes creating a three-dimensional digital model of a reticle; processing a plurality of features based on the digital model; generating an Augmented Reality application; and deploying the Augmented Reality application on a camera platform. The augmented reality alignment system includes processors and memory devices having instructions that, when executed by the processors, cause the processors to perform operations of creating a three-dimensional digital model of a reticle; processing a plurality of features based on the digital model; generating an Augmented Reality application; and deploying the Augmented Reality application on a camera platform. A non-transitory, computer-readable medium comprising instructions that, cause the processors to create a model of a reticle; process features based on the model; generate an Augmented Reality application; and deploy the application on a camera.

18 Claims, 7 Drawing Sheets

AUGMENTED REALITY FOR REFLECTIVE PARTICLE TAG ALIGNMENT

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to reflective particle tags. The application relates more specifically to methods and systems for using augmented reality applications for alignment of reflective particle tags.

Reflective Particle Tags, or RPT, have traditionally relied on physical alignment for accurate placement of the illumination system and camera optics. Repeatable illumination and photography of the tag is required for comparison of reference images with subsequent images. Originally contact reader designs for RPT used a docking mechanism. Later methods for reading RPT employed lasers for alignment and positioning, but laser alignment also required physical contact with the item tagged with an RPT. The Japan Atomic Energy Agency (JAEA) employed a mechanical jig to hold the RPT reader in position, again by means of contact with the tagged item, although no permanent docking mechanism or fiducial needed to be affixed with the tag. The JAEA alignment jig was a customized device and was unsuitable for applying a generic RPT solution.

Recent improvements in illumination systems, optics, and image processing algorithms now make a true non-contact stand-off RPT reader possible. One key hurdle is the need for precise positioning of the RPT reader among six degrees of freedom.

The optical axis must be correctly positioned in three-dimensional space in x, y, z axes, and its rotational orientation with respect to the tag must be fixed with respect to roll, pitch and yaw. This alignment problem is similar to using a gunsight or, in the case of looking downward on an RPT, a bombsight. Thus a visual system that performs as a pair of bombsight reticles could be used for alignment of RPT.

Augmented Reality applications provide a method for projecting a simulation of a three-dimensional structure upon a real-time video stream based on a fixed frame of reference. For many Augmented Reality applications, the frame of reference is a Global Positioning System (GPS) location, compass direction, and altitude angle. GPS or compass-based Augmented Reality may be used to identify a building. More recently, feature recognition algorithms have enabled the use of two-dimensional reference images to determine the frame of reference, e.g., a three-dimensional image floating or suspended over a two-dimensional reference image.

Reflective particle tags, or labels, may be applied to containers and other articles for monitoring. Containment and surveillance measures are critical to any verification regime in order to monitor certain highly secured and restricted activities, e.g., transportation of nuclear fuel and its components across international borders; to detect undeclared activities related to national security and restricted activities; to verify the integrity of equipment or items; to reduce inspector burden; and to maintain a chain of custody between inspections.

A tag is an exemplary measure used to establish the identity of an accountable item and maintain the chain of custody for the respective item. Tags must also provide evidence of tampering of the tag itself, e.g., counterfeiting or substitution, and if applied in an appropriate manner, e.g., across a seam of a container, a tag may also provide evidence of tampering with the item. Continual improvement of measures such as tags is required to counteract technical advances of adversaries which could render C/S equipment obsolete with a single technical advancement. Furthermore, new architectures are required to respond to changing requirements arising from the introduction of new procedures or approaches, and it is often desirable to incorporate technological advances that provide efficiency gains or allow deployment in new application spaces.

The RPT was developed to identify items that must be accounted for under international treaties. In most instances, the tag, or RPT, is composed of an article with unique optical characteristics, e.g., specular hematite particles randomly dispersed in a clear, adhesive polymer matrix.

Reflective Particle Tags (RPT) use the reflective properties of numerous microscopic reflective crystals within a hardened acrylic resin to create a unique identifier for an object. RPTs may be applied within a small fiducial for accurate alignment by physical docking with an imaging device. The RPT architecture is effective for detection of counterfeiting and removal of tags. Furthermore, RPTs require no power source, and maintain stability through temperature extremes, rough handling, and years of service. Such attributes make RPTs suitable for applications with strict facility acceptance requirements and for deployments in which a semi-permanent tag should be attached to an item to be monitored.

What is needed is an RPT system and method that allows accurate alignment of the RPT camera without physical contact by means of an augmented reality software application that allows the user to view a virtual "bombsight" comprised of two digital reticles. These digital reticles are the functional equivalent of, e.g., crosshairs on a rifle scope. The following disclosure describes a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a method for visual alignment of Reflective particle tags. The method includes creating a three-dimensional digital model of a reticle; processing a plurality of features based on the digital model; generating an Augmented Reality application and deploying the Augmented Reality application on a camera platform.

Another embodiment relates to an augmented reality alignment system including one or more processors and one or more memory devices having instructions that, when executed by the one or more processors, cause the one or more processors to perform operations including creating a three-dimensional digital model of a reticle; processing a plurality of features based on the digital model; generating an Augmented Reality application and deploying the Augmented Reality application on a camera platform.

Another embodiment relates to a non-transitory, computer-readable medium comprising instructions that, when executed by one or more processors, cause the one or more processors to perform operations comprising: creating a three-dimensional digital model of a reticle; processing a plurality of features based on the digital model; generating an Augmented Reality application and deploying the Augmented Reality application on a camera platform.

The augmented reality alignment system for RPT is configured to project two virtual alignment reticles into the field of view of a computer imaging unit, e.g., a smartphone or tablet computer. By placing the imaging unit at the appropriate distance and making the sides of the reticles parallel to the RPT fiducial, repeatable, accurate positioning of the system is possible.

Certain advantages of the embodiments described herein include an Augmented Reality software application that may be employed to visualize a pair of reticles above an RPT fiducial, which provides the frame of reference. A software stack may include: a 3D modeling software application; a feature recognition application; an Augmented Reality plugin application for a 3D gaming engine, for generating the AR application; and a scripting language.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
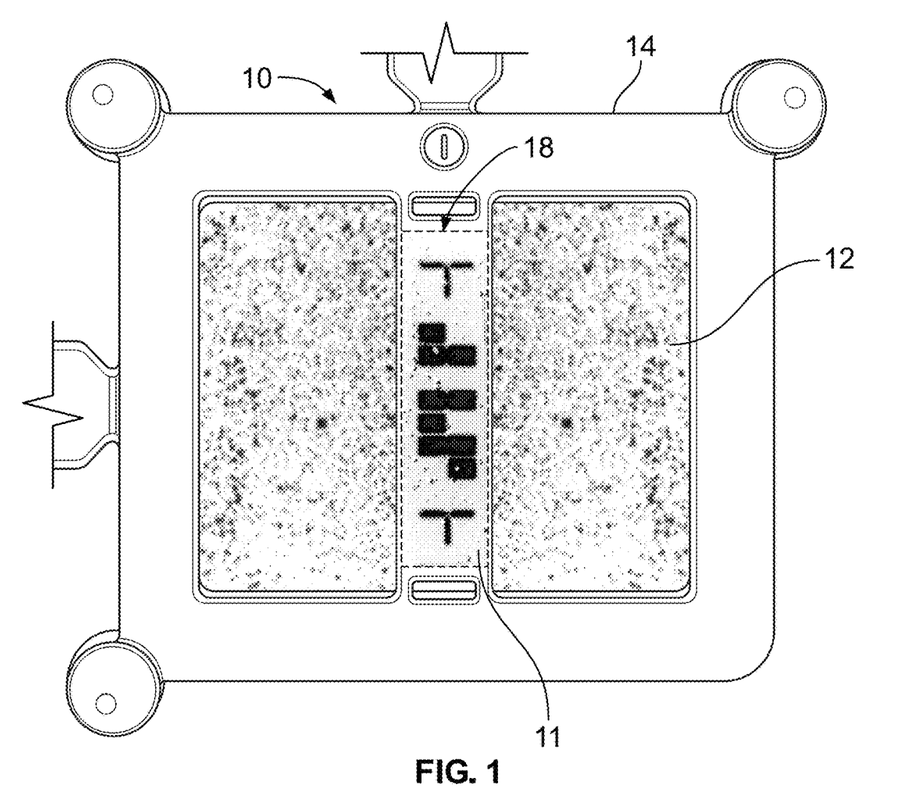
FIG. 1 shows an exemplary embodiment of a contact-type reflective particle tag (RPT) having a frame with a unique RPT identifier.

Referring to FIG. 1, a contact-type reflective particle tag 10 is shown, for use with an imaging reading device, or reader, (not shown) which may be affixed to the RPT 10. A reader, or image sensor 712 (FIG. 7A) is applied to a direct-contact reader frame 14. Frame 14 includes a pair of RPT portions 12 disposed on either side of a unique RPT identifier 18 attached to a center bar 11 of frame 14, which lies beneath RPT identifier 18. RPT identifier 18 may be, e.g., a unique binary code identifier such as a bar code, QR code, RFID, numerical code, or similar means for retrieving the RPT 10 from a data storage address. In an embodiment, RPT identifier 18 may also include faceted specular hematite particles as used in the exemplary RPT portion 12. Frame 14 and RPT portions 12 may be rectangular, as shown in FIG. 1, or other geometrical shapes as suited to the application.

Figure 2:
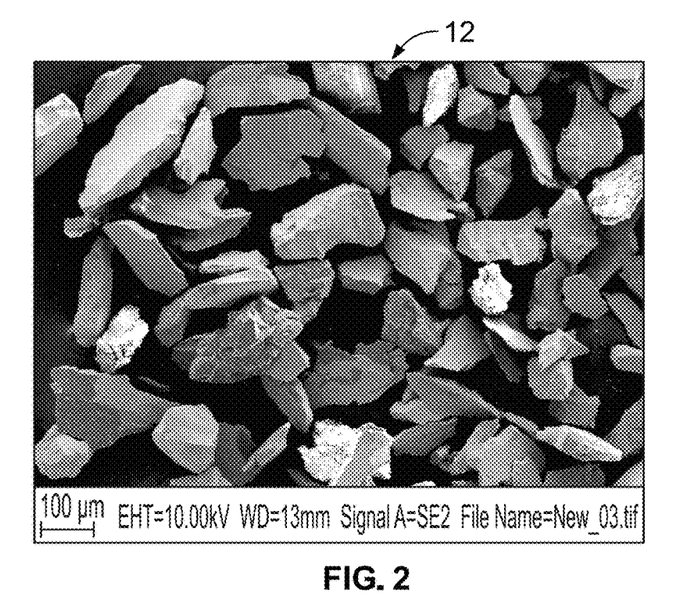
FIG. 2 shows a scanning electron microscope image of faceted specular hematite particles used in the RPT system.

FIG. 2 shows a magnified view of a commonly used RPT portion 12 including hematite particles 12 with dimensions approximately 80 μm and having flat, reflective facets. In a contact-type RPT system, in order to inspect tag 10, a reader, or camera, is physically attached to the frame 14 for precise alignment. The reader records images using multiple illumination angles. For each of the illumination angles, only a subset of the hematite facets will be oriented in such a manner as to redirect the incident illumination beam toward the aperture of the camera, collectively referred to as the reflection criterion. This subset appears as small bright spots in a recorded image as shown in FIG. 2. In this manner, a sequence of complex and highly unique patterns may be recorded and stored in a data storage device (not shown). The recorded patterns may be used to authenticate the tag at a later date. A unique, barcode-like identifier 18 may be placed at a center bar 11, or region (see, e.g., FIGS. 1 & 5) to allow rapid retrieval of reference images. Once an RPT tag 10 with RPT portions 12 is set, an inspector can return to the item, attach a reader, compare barcode or other IDs with reflective patterns in order to determine if tag patterns are a match.

Figure 3:
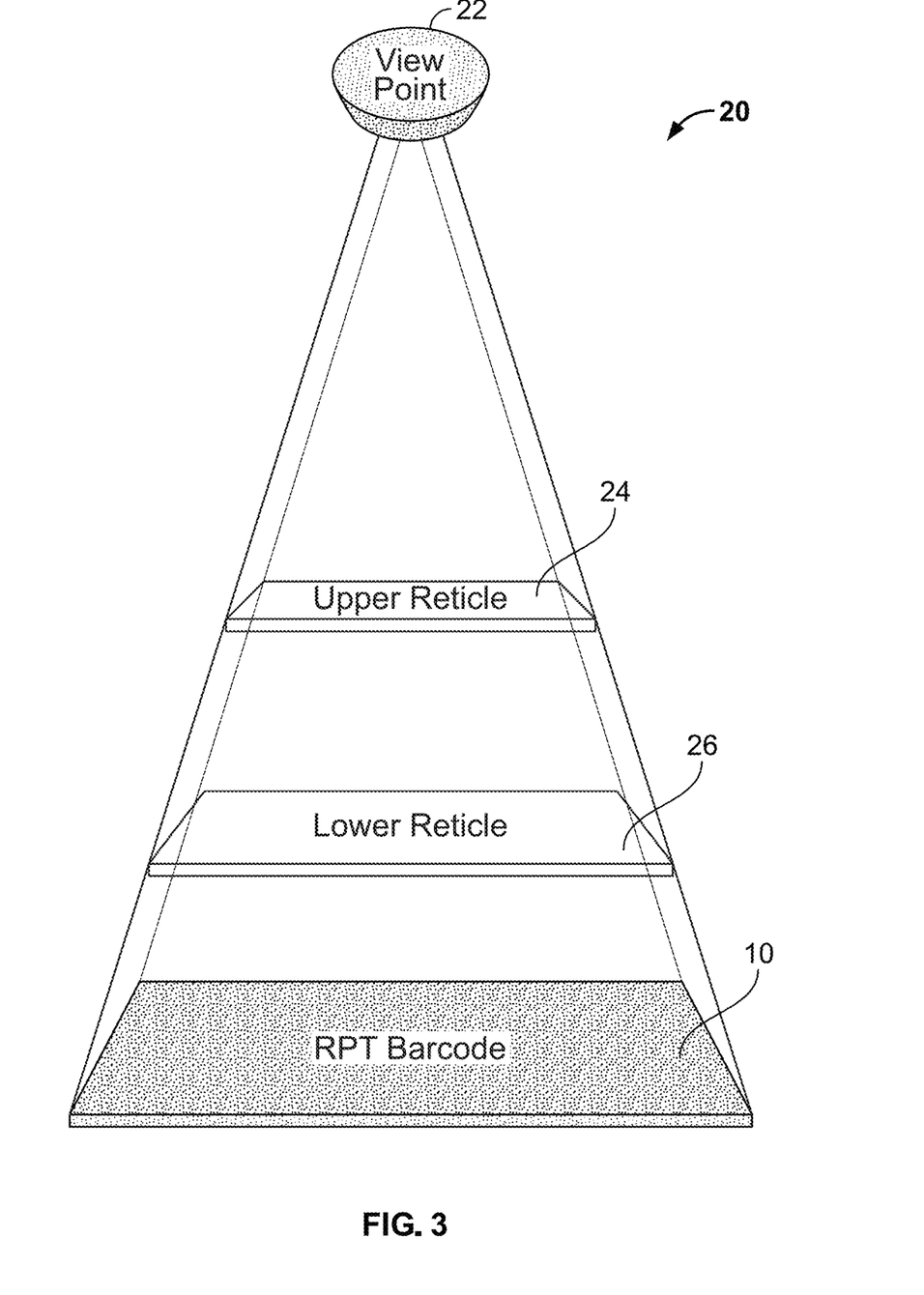
FIG. 3 shows a three dimensional schematic of the augmented reality (AR) elements.
Figure 7A:
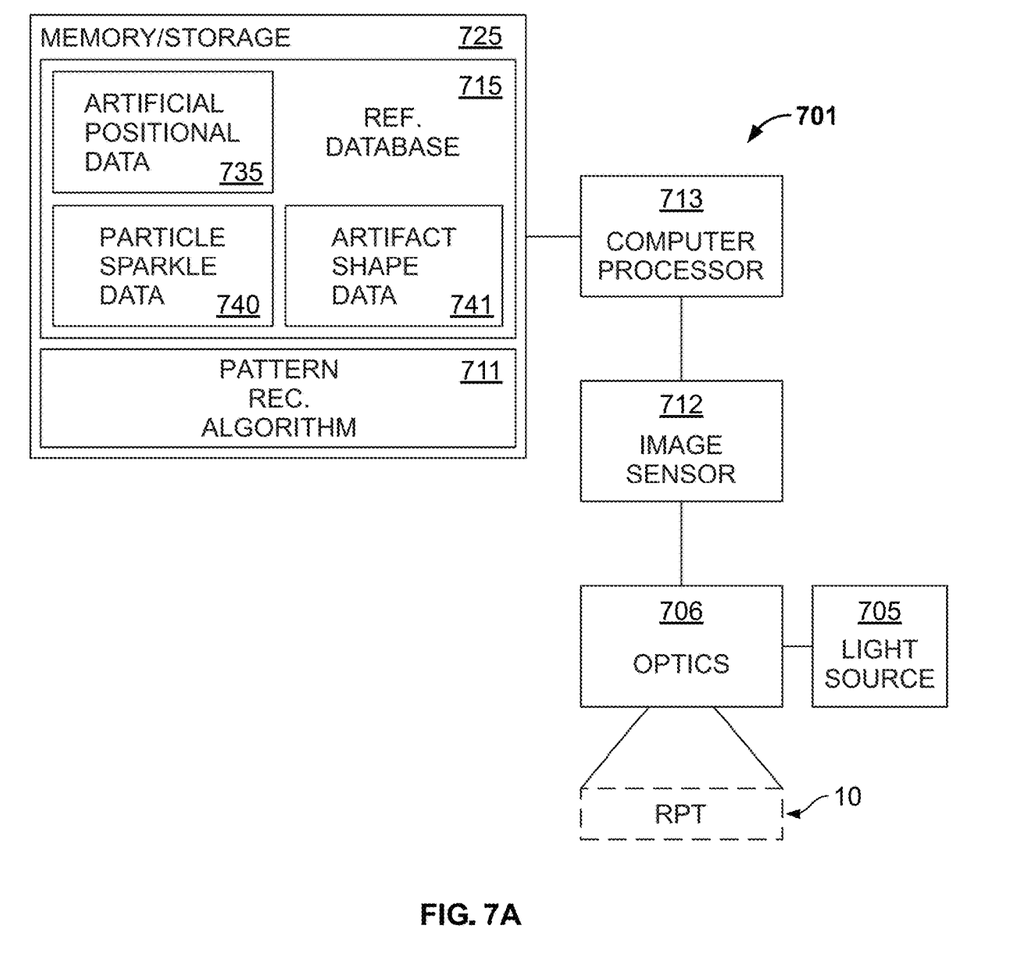
FIG. 7A illustrates a schematic of an exemplary apparatus for automatically performing the method.
Figure 8:
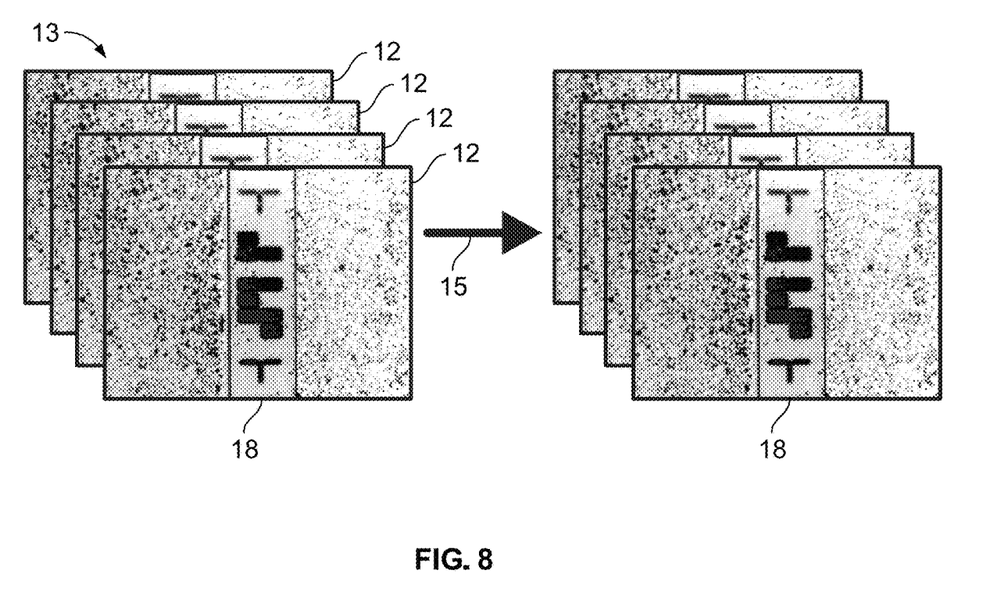
FIG. 8 shows an exemplary feature set generated by AR elements shown in FIG. 3.

Referring next to FIGS. 3 and 8, Augmented Reality may be used to visualize a pair of reticles above the RPT fiducial, which provides the frame of reference. In one exemplary embodiment, a software stack is provided which includes three-dimensional modeling software, such as Blender open source graphics software, a feature recognition system, such as Vuforia, provided by PTC Corporation, with Augmented Reality software extension for a three-dimensional gaming engine such as Unity, by Unity Technologies. The three-dimensional gaming engine generates the Augmented Reality application. A scripting language, e.g., Python, is used to generate the Augmented Reality application. The feature recognition system receives an image of the RPT identifier 18 at the central bar 11 of a fiducial disposed on the RPT 10. In an embodiment, the fiducial is designed for application on a direct contact reader, or image sensor 712 (FIG. 7A). The resulting feature set is shown in FIG. 8. FIG. 8 shows an exemplary feature set generated by AR elements shown in FIG. 3. An RPT reader 712 generates multiple images of RPT tag 10 from multiple angles and compares the reflection patterns for verification. The reader acquires multiple reference images 13 (FIG. 8) of RPT 10 and transfers reference images 13 to a database 715 (FIG. 7A) for later retrieval. The RPT 10 can then later be read, and compared to RPT identifiers 18 and RPT reference images 13 to verify RPT 10.

Referring to FIG. 3, the three-dimensional model 20 consists of two quadrilateral frames or reticles 24, 26 of different sizes. An upper reticle 24 and a lower reticle 26 are placed at appropriate distances from the reference image, or RPT barcode 10, respectively. Reticles 24, 26 are constructed in three-dimensional modeling software and resized and positioned between a view point 22 and reference image 10 in a gaming engine. The reticles are examined from a view point 22 opposite the reference image 10 as illustrated schematically in FIG. 3.

Figure 4:
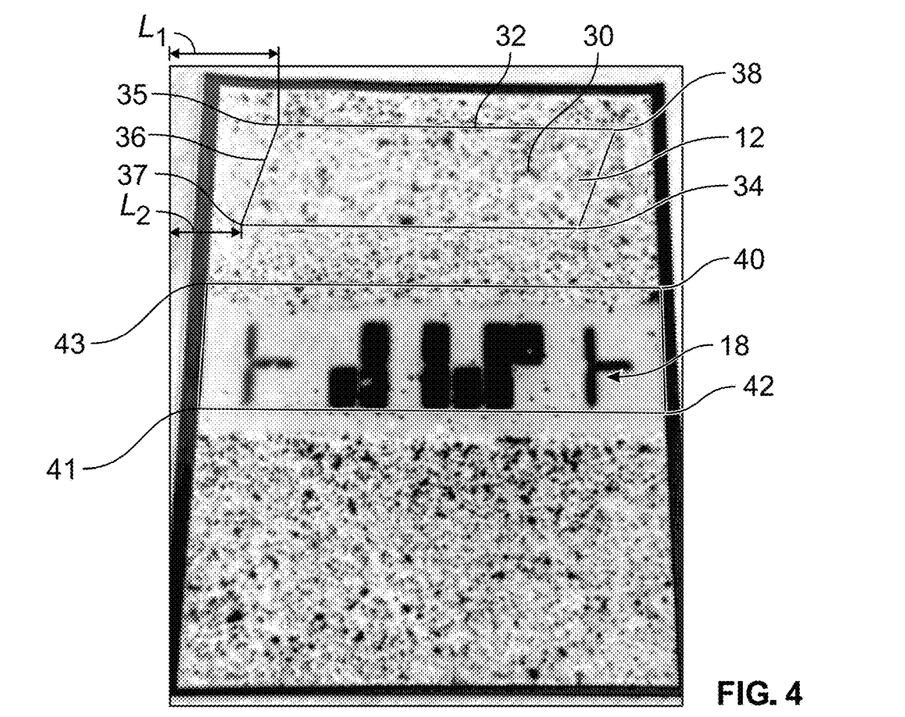
FIG. 4 shows an alternate embodiment of a non-contact RPT having a reticle, in which the reticle is misaligned.
Figure 5:
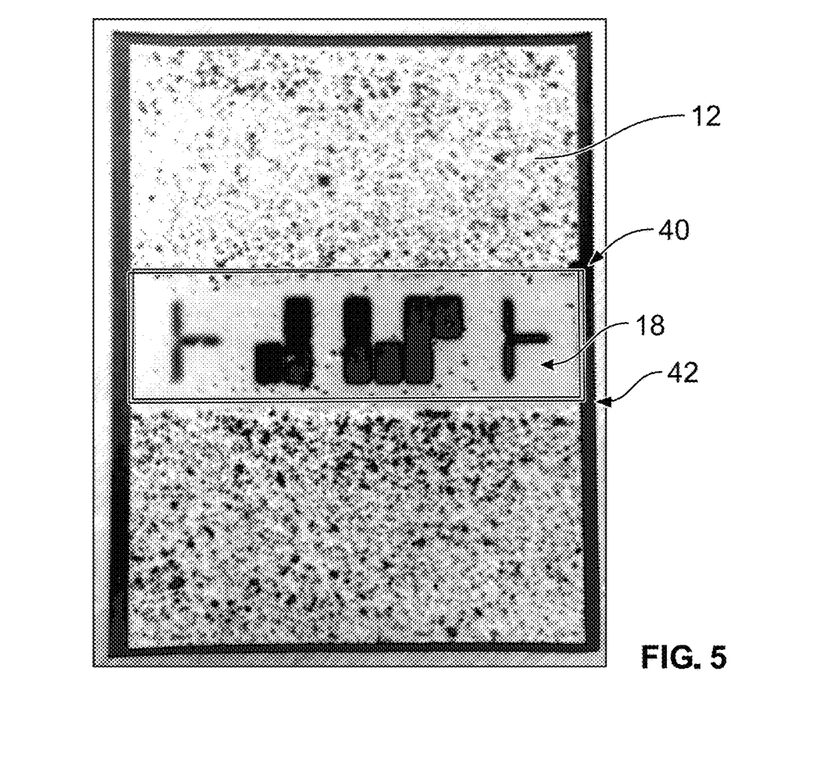
FIG. 5 shows the reflective particle tag of FIG. 4 in which the reticle is in alignment.

The feature recognition system 711 (FIG. 7A) may be provided with an image of an RPT identifier 12 at the central part of the tag's fiducial 30 (See, e.g., FIGS. 4 and 5). The resulting feature set is shown in FIG. 1.

The 3D model 20 includes a pair of quadrilateral frames, 24, 26. Frames 24, 26 are placed at predetermined distances from reference image, i.e., RPT barcode 12. Frames may be constructed in 3D modeling software, resized and positioned relative to the reference image in the 3D gaming engine.

Figure 6:
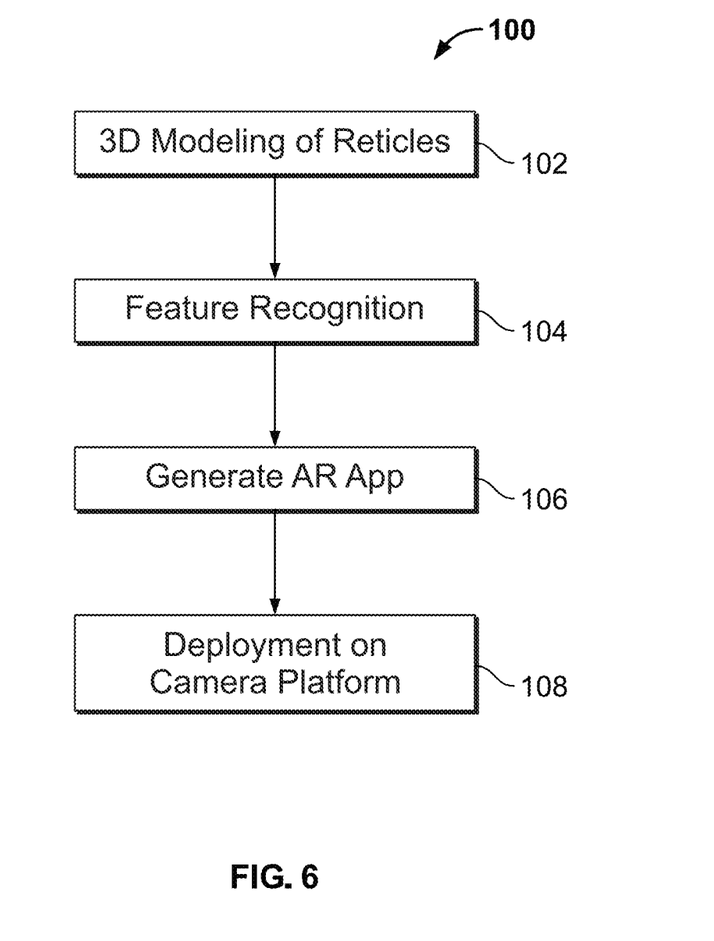
FIG. 6 shows a process flow diagram for the augmented reality application for use with a Reflective Particle Tag reader.

Referring next to FIG. 6, a process diagram 100 is shown. At step 102, three dimensional (3D) models of reticles are generated using 3D modeling software. In one embodiment, the 3D model may be generated with Blender 3D modeling software. A digital rectangular "frame" or image is created from cylindrical graphical elements at step 102, and the digital rectangular image is imported into a game engine. An augmented reality software development kit (SDK) for mobile devices enables the creation of the augmented reality applications. In an embodiment, the game engine may be a Unity game engine and the augmented reality SDK may be a Vuforia plug-in to the Unity game engine.

Next, at step 104, feature recognition is processed. The 3D model from step 102 is positioned above a digital representation of an RPT fiducial 30, 40. A copy of the rectangular element is then made. The copy of the rectangular element is next moved into alignment above the first rectangular element, and the respective rectangular elements are scaled such that they form a pair of reticles for sighting. When viewed from a unique x-y-x position, the edges of the fiducial, the first reticle, and the second reticle are superimposed. When viewed from a proper orientation, all edges of the reticles are parallel to the edges of the camera viewfinder. This permits precise alignment of all 6 degrees of freedom so that photographic images may be repeatably taken by the RPT system. Six degrees of freedom refers to the freedom of movement of a rigid body in three-dimensional space. Specifically, the body is free to change position as forward and backward, up and down, left and right translation in three perpendicular axes, combined with changes in orientation through rotation about three perpendicular axes, often termed yaw, or normal axis, pitch, or transverse axis, and roll, or longitudinal axis.

Next, at step 106, the system 100 generates an Augmented reality application, or "AR app". FIG. 4 shows a misaligned image of the Augmented Reality app. FIG. 5 shows an aligned image of the Augmented Reality app. A fiducial 30 is represented as a rectangular section of the RPT that is selected for the reference image. Fiducial 30 is bounded by a horizontal line 32 on its upper edge and a horizontal line 34 on its lower edge, parallel with line 32. Lines 32 and 34 are intersected by left and right vertical edges 36, 38, respectively, to enclose the fiducial 30. Line 32 and line 36 intersect at a point $x_1$, $y_1$ indicated by 35 at the upper left corner of fiducial 30. Line 34 and line 38 intersect at a point $x_2$, $y_2$ indicated by 37 at the lower left corner of fiducial 30. The upper edge of fiducial 30 at point $x_1$, $y_1$ is offset from the left edge of the reference image a distance of $l_1$, and the lower edge of fiducial 30 at point $x_2$, $y_2$ is offset a distance $l_2$ from the left edge of the reference image, as indicated in FIG. 4.

Referring next to FIG. 5, two horizontal parallel line segments 40, 42 border the upper and lower horizontal edges of tag 10. Line 40 intersects the left edge of the RPT image at point $x_3$, $y_3$. indicated by 41 and line 40 intersects the left edge of the RPT image at point $x_4$, $y_4$, indicated by 43.

Next, at step 108, the Augmented Reality application is deployed on a camera platform. An AR application may be simply deployed to a mobile device where it can be operable on entry of a command. Upon initialization, the Augmented Reality set is loaded from an embedded database, the device's camera is activated, and when the feature detection algorithm locates a matching reference image, the 3D virtual image is superimposed on the view screen. Once the reference image is obtained in the camera's field of view, it is tracked and the virtual image modified as the point of view changes.

For the RPT application, the user needs to move the device until two conditions are met to ensure proper alignment. For the first condition to be satisfied, the two reticles must overlap, indicating that the optical system is at the correct distance along the z axis and that the x and y axes are not rotated out of alignment (FIG. 5). For the second condition, the reticle sides must be parallel to the sides of the viewfinder, indicating that the Z axis, i.e., the $4^{th}$ degree of freedom, is not rotated out of alignment, Scripting and Initiating Automatic Behaviors In an embodiment, the RPT application relies on the operator to recognize that the above conditions are met and initiate the RPT illumination/imaging system. However, in a preferred embodiment, the three-dimensional Augmented Reality software stack permits frame-by-frame determination of pixel locations of the virtual objects within the camera field of view. FIG. 8 shows an exemplary reference set of RPT reader images 13 of RPT tags 12 acquired at multiple lighting angles. The multiple reference images 13 are transferred to the reader 15 and the RPT identifiers 18 are first compared, then the reflective patterns of the reference images compared, to determine if the RPT images match the reference images.

An exemplary algorithm is disclosed below. The algorithm verifies alignment of the RPT and automatically initiates the RPT illumination and imaging system when the respective alignment of the reticles is determined to be within acceptable tolerances.

Based on the coordinates of the points identified above with respect to FIG. 4, the first condition is met when $(x_1,y_1)=(x_3,y_3)$ and $(x_2,y_2)=(x_4,y_4)$. Similarly, the second condition is met when $l_1=l_2$, where $l_1$ is the distance to $x_1$ and $l_2$ is the distance to $x_2$, measured from the left edge of the image. Since $l_1=x_1$ and $l_2=x_2$, the second condition is thus met when $(x_1, y_1)=(x_2, y_2)$.

Because of small random motions in the system, especially if handheld, it is expected that exact pixel-for-pixel equality may not be simultaneously acquired for all points. A small value, δ, is added or subtracted from one side of the comparison equations to account for insignificant differences. Algorithm 1 is thus as follows:

If $(x_1-\delta < x_3 < x_1+\delta)$ and $(x_2-\delta < x_4 < x_2+\delta)$ and $(y_1-\delta < y_3 < y_1+\delta)$ and $(y_2-\delta < y_4 < y_2+\delta)$ and $(x_1-\delta < x_2 < x_1+\delta)$:triggerEvent( )=true In an embodiment, the system may be mounted on hardware that is suitable for performing rigorous measurements of accuracy for initial recognition of a feature set and for subsequent tracking of the feature set. The larger the sample of handheld data may provide a more suitable value for 6 may be derived.

In an alternate embodiment, a fiducial is available for use with Augmented Reality systems comprising a frame marker target. These frame marker targets include a square frame that acts as an identifier and frame of reference, independent of the contents of the square. The unique identification of a frame marker is encoded into a binary black and white pattern along the border of the marker image. A frame marker allows any virtual image to be placed within the marker borders. Areas in the sample may be filled with the RPT matrix. If a single frame marker target is associated with the alignment reticles and that frame is incorporated into the RPT reticle, the alignment application would work with all RPT instances without the need for any further target management.

Alternately, frame marker targets may be used in conjunction with any RPT strategy that repeatably positions the tagged object, for example, a system that accurately places an item in a jig or test stand. In this case, the frame marker targets are disposed in the field of view adjacent the reader, and attached to the stand. Since the Augmented Reality application simultaneously tracks up to 5 frame markers, it is possible to avoid occlusion and blocked lines of sight even for complex use cases by using multiple targets. Accuracy of object placement within a test stand is essential with this configuration.

An alternate embodiment of the Augmented Reality application provides for text-based targets. These text-based targets comprise text strings from which the Augmented Reality application extracts a frame of reference based on optical character recognition (OCR).

FIG. 7A illustrates a schematic of an apparatus for automatically performing the method 100. In a first embodiment, at operation 701, an RPT 10 is illuminated by light source 705 through optics 706. Alignment fiducials 30 are identified with a feature recognition application 711 executed by the computer processor 715. Upon successful recognition of the alignment fiducials 30, a reference orientation for the RPT 10 is saved to a memory or mass storage device 725 in the reference database 715.

At operation 701, a portion of the RPT 10 containing the particle population embedded in an adhesive matrix (e.g., particle population in FIG. 2) is similarly illuminated and image data from particle population collected with an image sensor 712, such as a CMOS camera or mobile telephone camera. The computer processor 713 executes another pattern recognition algorithm to analyze particle image data in search of physical features matching one or more predetermined shapes, which may for example be accessed from shape data 741 stored to the memory 725. Any conventional edge or contrast based pattern recognition algorithms known in the art may be employed. Each particle tag identified as a match with one of the predetermined shapes is then associated with a relative position within the RPT 10, in the first embodiment relative to the alignment fiducials 30. The position of the identified RPT 10 is then stored to memory 725 as positional data 735. For an RPT embodiment, a reflected light pattern is measured and particle sparkle data 740 is further associated with the artifact positional data 735 and artifact identity (shape data 741) in the reference database 715.

Figure 7B:
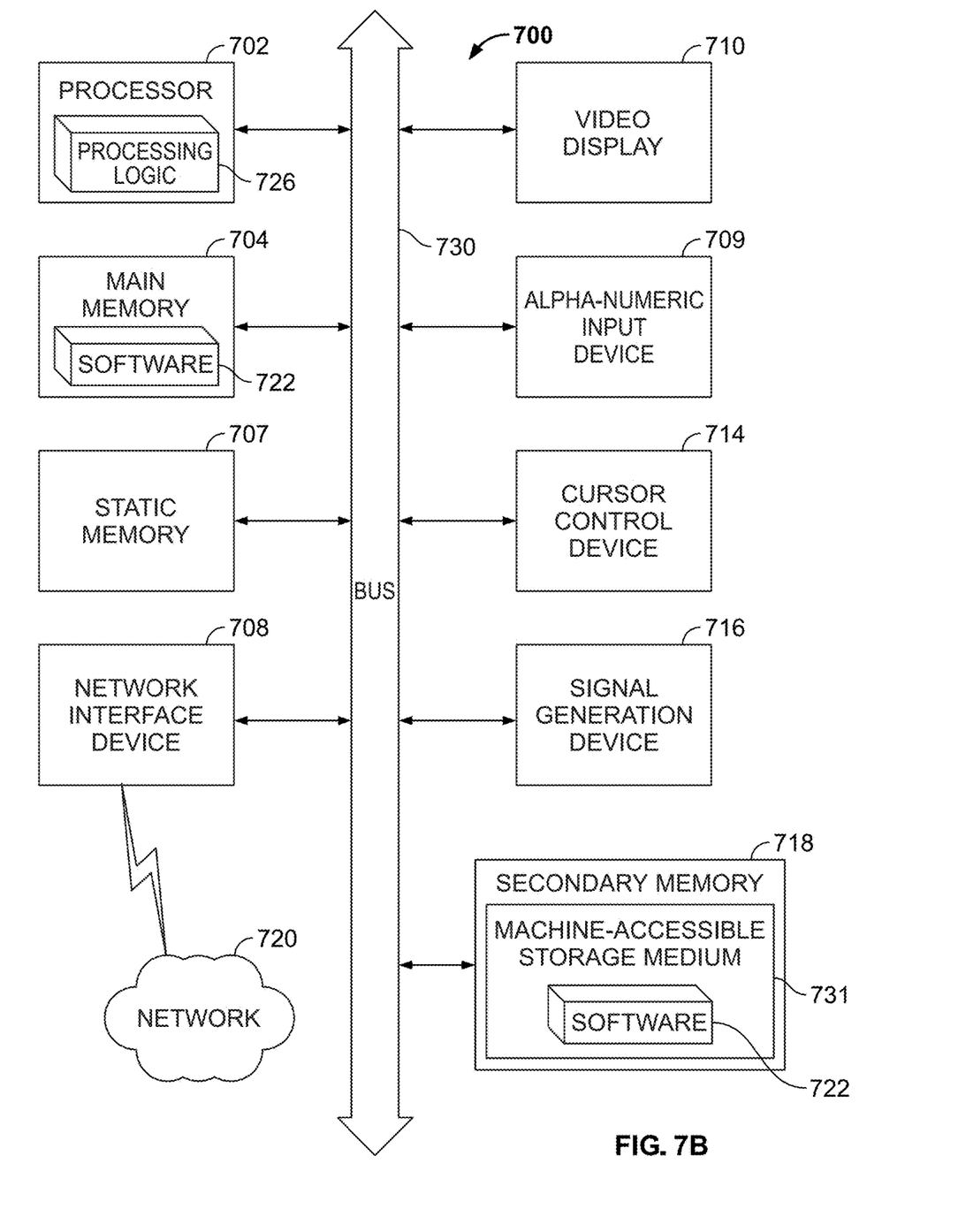
FIG. 7B illustrates an exemplary computer system for executing the algorithms and storing instructions for automatically performing the method.

FIG. 7B illustrates a computer system 700 within which a set of instructions, for causing the machine to execute one or more of the algorithms discussed herein may be executed, for example to analyze a reflected light from a tag to identify at least one micromachine artifact. The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 707 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 709 (e.g., a keyboard), a cursor control device 714 (e.g., a mouse), and a signal generation device 716 (e.g., a speaker).

The secondary memory 718 may include a machine-accessible storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface device 708.

The machine-accessible storage medium 731 may also be used to store pattern recognition algorithms, artifact shape data, artifact positional data, or particle sparkle data. While the machine-accessible storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the augmented reality application for alignment of reflective particle tags, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but al so equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method for visual alignment of Reflective particle tags comprising:
   creating a three-dimensional digital model of a reticle;
   processing a plurality of features based on the digital model;
   generating an Augmented Reality application; and
   deploying the Augmented Reality application on a camera platform;
   wherein the step of processing a plurality of features based on the digital model further comprises positioning the three-dimensional model above a digital representation of a fiducial image disposed on a reflective particle tag.

2. The method of claim 1, further comprising creating the three dimensional model of a reticle with a three-dimensional modeling software application.

3. The method of claim 1, wherein the step of creating a three-dimensional digital model further comprises creating a digital rectangular image from a cylindrical graphical element, and importing the digital rectangular image into a game engine.

4. The method of claim 3, further comprising:
   viewing a misaligned image of the augmented reality application and an aligned image of the augmented reality application; and
   providing a reference image representing a fiducial as a rectangular section of the RPT, the fiducial bounded by a first line on an upper edge and a second line a lower edge; the first line and the second line intersecting at a left edge of the fiducial and a right edge of the fiducial.

5. The method of claim 4, further comprising moving the camera platform until proper alignment is ensured; wherein ensuring proper alignment comprises overlapping the two reticles, the overlapping indicating that the camera platform is at the correct distance along the z axis and that the x and y axes are not rotated out of alignment; and
   aligning the reticle sides parallel to the sides of the viewfinder, the parallel sides indicating that the Z axis is not rotated out of alignment.

6. The method of claim 1, further comprising generating a copy of the fiducial image.

7. The method of claim 6, further comprising moving the copy of the fiducial image into alignment above the fiducial image, and scaling the respective fiducial images to form a pair of reticles for sighting.

8. The method of claim 7, further comprising:
   wherein each of the first reticle and the second reticle comprises a plurality of edges; and
   superimposing the first reticle and the second reticle.

9. The method of claim 8, further comprising:
   viewing the first reticle and the second reticle in parallel with at least one edge of a camera viewfinder; and
   aligning the first reticle and the second reticle in six degrees of freedom in a three-dimensional space.

10. The method of claim 1, further comprising performing a frame-by-frame determination of pixel locations of a plurality of virtual objects within a field of view of the cameral platform;
    verifying the RPT in alignment; and initiating an RPT illumination and imaging system automatically in response to determining the alignment is within acceptable tolerances.

11. The method of claim 10, further comprising:
wherein the RPT is verified in alignment based on the coordinates of the points identified above, the first condition is met when a first intersection point $(x_1,y_1)$ of the first reticle is equal to a corresponding first intersection point $(x_3,y_3)$ of the second reticle; and a second intersection point $(x_2,y_2)$ of the first reticle is equal to a second intersection point $(x_4,y_4)$ of the second reticle;
wherein distance $l_1$ to $x_1$ and $l_2$ is the distance to $x_2$, measured from a left edge of an image.

12. An augmented reality alignment system comprising:
one or more processors;
one or more memory devices comprising instructions that, when executed by the one or more processors, cause the one or more processors to perform operations comprising:
creating a three-dimensional digital model of a reticle;
processing a plurality of features based on the digital model;
generating an Augmented Reality application; and
deploying the Augmented Reality application on a camera platform;
wherein the operations further comprise positioning the three-dimensional model above a digital representation of a fiducial image disposed on a reflective particle tag.

13. The system of claim 12, wherein the operations further comprise: creating the three dimensional model of a reticle with a three-dimensional modeling software application.

14. The system of claim 12, wherein the operations further comprise creating a digital rectangular image from a cylindrical graphical element; and importing the digital rectangular image into a game engine.

15. The system of claim 12, wherein the operations further comprise: generating a copy of the fiducial image.

16. The system of claim 15, wherein the operations further comprise: moving the copy of the fiducial image into alignment above the fiducial image, and scaling the respective fiducial images to form a pair of reticles for sighting.

17. A non-transitory, computer-readable medium comprising instructions that, when executed by one or more processors, cause the one or more processors to perform operations comprising:
creating a three-dimensional digital model of a reticle;
processing a plurality of features based on the digital model;
generating an Augmented Reality application; and
deploying the Augmented Reality application on a camera platform;
wherein the step of processing a plurality of features based on the digital model further comprises positioning the three-dimensional model above a digital representation of a fiducial image disposed on a reflective particle tag.

18. A method for visual alignment of Reflective particle tags comprising:
creating a three-dimensional digital model of a reticle;
processing a plurality of features based on the digital model;
generating an Augmented Reality application; and
deploying the Augmented Reality application on a camera platform;
performing a frame-by-frame determination of pixel locations of a plurality of virtual objects within a field of view of the cameral platform;
verifying the RPT in alignment; and
initiating an RPT illumination and imaging system automatically in response to determining the alignment is within acceptable tolerances.

* * * * *